(12) United States Patent
Lappe et al.

(10) Patent No.: US 10,782,540 B2
(45) Date of Patent: Sep. 22, 2020

(54) METHOD FOR DEMONSTRATING OPTICAL PROPERTIES OF LENSES FOR SPECTACLE GLASSES (71) Applicant: Carl Zeiss Vision International GmbH, Aalen (DE)

(72) Inventors: Christian Lappe, Mutlangen (DE); Patrick Schaupp, Aalen (DE); Timo Mappes, Karlsruhe (DE)

(73) Assignee: Carl Zeiss Vision International GmbH, Aalen (DE)

( * ) Notice: Subject to any disclaimer, the term of this patent is extended or adjusted under 35 U.S.C. 154(b) by 321 days.

(21) Appl. No.: 15/705,371

(22) Filed: Sep. 15, 2017

(65) Prior Publication Data
US 2019/0086691 A1    Mar. 21, 2019

(51) Int. Cl.
*G02C 7/02*    (2006.01)
(52) U.S. Cl.
CPC .................... *G02C 7/027* (2013.01)
(58) Field of Classification Search
CPC .......... G02C 7/02; G02C 7/028; G02C 7/101; G02C 7/04; G02C 7/061; G02C 7/083; G02C 2202/20; G02C 2202/18; G02C 7/027; G02C 2202/16; G02C 2202/22; G02C 7/12; G02C 7/022; G02C 7/024; G02C 7/044; G02C 7/102; G02C 7/041; G02C 7/06; G02C 13/005; G02C 1/02; G02C 7/042; G02C 7/068; G02C 7/088; G02C 13/001; G02C 13/003; G02C 1/023; G02C 1/10; G02C 2202/10; G02C 2202/24; G02C 5/00; G02C 7/025; G02C 7/047; G02C 7/049; G02C 7/063; G02C 7/066; G02C 7/085; G02C 7/086; G02C 7/10; G02C 7/104; G02C 7/105; G02C 11/02; G02C 11/12; G02C 1/00; G02C 1/04; G02C 1/06; G02C 1/08; G02C 2200/02; G02C 2200/08; G02C 2202/02; G02C 2202/04; G02C 2202/08; G02C 2202/12;

(Continued)

(56) References Cited

U.S. PATENT DOCUMENTS

| | | | |
|---|---|---|---|
| 2005/0088616 A1* | 4/2005 | Nason | G02C 7/061 351/159.74 |
| 2005/0104240 A1* | 5/2005 | Jethmalani | B24B 13/00 264/1.38 |
| 2016/0154255 A1* | 6/2016 | Bonnin | G06T 15/06 382/154 |

OTHER PUBLICATIONS

Office action by the French Patent Office issued in FR1858266, which is a counterpart application, dated Feb. 7, 2019 and English-language translation thereof.

(Continued)

*Primary Examiner* — Collin X Beatty
*Assistant Examiner* — Grant A Gagnon
(74) *Attorney, Agent, or Firm* — Thrive IP®; Georg M. Hasselmann (57) ABSTRACT

A method for demonstrating optical properties of a lens for spectacle glasses is disclosed in which a demonstration tool displays an optical property of the lens. The demonstration tool includes a light source and a light sensor receiving light from the light source. Placing a lens in the beam path between the light source and the light sensor changes the readout from the light sensor and the change in readout is converted into an optical property of the lens. An observer sees the optical property of the lens on a display.

16 Claims, 5 Drawing Sheets

(58) Field of Classification Search
CPC .......... G02C 5/02; G02C 7/046; G02C 7/048; G02C 7/08; G02C 7/108; G02C 7/14; G02C 7/16
USPC ........................................................ 351/159
See application file for complete search history.

(56) References Cited

OTHER PUBLICATIONS

Image of UV+ 420_cut apparatus (manufacturer unknown), Oct. 11, 2017.
Online video "Tokai Eye Care Design Lutina ENG," Tokai Optics, Published on Jan. 18, 2016, 11 screenshots provided, video available at: https://www.youtube.com/watch?v=0OB9SrfgaDY, last accessed Jan. 21, 2018.

* cited by examiner

METHOD FOR DEMONSTRATING OPTICAL PROPERTIES OF LENSES FOR SPECTACLE GLASSES

TECHNICAL FIELD

The disclosure relates to a method for demonstrating optical properties of a lens for a pair of spectacle glasses to an observer. A demonstration tool including a light source and a light sensor is provided, which can measure the optical properties of the lens.

BACKGROUND

It is known to provide optical glasses to correct for ametropia of the human eye, such as myopia, hyperopia, or astigmatism. Moreover, it is known to provide optical glasses with anti-reflective (AR) coatings, for example, to reduce reflected light that could be perceived as irritating by a person looking at a wearer of spectacle glasses that do not have an AR coating. Further, AR increase the amount of light transmitted through the lens. Thus, AR coatings serves two effects: 1) they provide better optical transmissive performance, and 2) they exhibit less surface reflections. As more and more ways for individualizing eye glasses become available, the number of options for selecting lenses for spectacle glasses is increasing at the same rate. As a result, the task of finding the optimal glasses for a pair of spectacle glasses that best suit the wearer's need is also increasing in complexity.

Adding to the complexity is the interplay of various external parameters required for finding optimal glasses. For example, spectacle glasses should not only manifest the wearer's aesthetic preferences, but must also be suitable for the viewing habits and the lifestyle of the wearer. Thus, a frame for spectacle glasses should not only be aesthetically pleasing, but it must also be able to accommodate the wearer's lifestyle. At the same time, even if a specific frame is desirable to a consumer shopping for new glasses, the frame may not be suitable for a lifestyle that involves participating in physical activity frequently and/or with a high intensity.

Similarly, it is also becoming more complex to recommend lenses to a consumer. For example, an ophthalmologist or optometrist is not only tasked with determining the refractive error of the eye, the position of wear, and the fitting parameters of the preferred frame, but also with taking into account external parameters, such as viewing habits, when recommending a particular type of lens. What is more, when selecting a lens, different patients may prefer explanations with different levels of detail about the underlying optical properties of a lens that make it particularly suitable for them.

SUMMARY

It is an object of the present disclosure to advise a consumer during the selection of a lens for spectacle glasses and to educate persons recommending or selling lenses by providing a method for demonstrating an optical property of a lens for spectacle glasses using a demonstration tool.

According to an aspect of the disclosure, a method of advising a consumer who is selecting a lens for spectacle glasses includes: i) obtaining information from the consumer about at least one of the consumer's viewing habits and the consumer's lifestyle; ii) providing a demonstration tool having a light source and a light sensor for measuring light emitted from the light source; iii) establishing an electronic communication between the demonstration tool and a display device; iv) placing a lens for spectacle glasses between the light source and the light sensor; v) measuring an optical property of the lens; vi) displaying the optical property of the lens on the display device to an observer; vii) optionally, informing the observer how the optical property might affect at least one of a visual perception, a wellbeing, an eye heath status, and an eye health condition of a wearer of spectacle glasses that include the lens; and viii) making a recommendation for the lens that takes into account the optical property of the lens.

According to another aspect of the disclosure, a method of educating an observer how to demonstrate an optical property of a lens for spectacle glasses includes: i) providing a demonstration tool having a light source and a light sensor for measuring light emitted from the light source; ii) establishing an electronic communication between the demonstration tool and a display device; iii) placing a lens for spectacle glasses between the light source and the light sensor; iv) measuring an optical property of the lens; v) displaying the optical property of the lens on the display device to an observer; and vi) optionally, informing the observer how the optical property might affect at least one of a visual perception, a wellbeing, an eye health status, and an eye health condition of a wearer of spectacle glasses that include the lens.

BRIEF DESCRIPTION OF THE DRAWINGS

The disclosure will now be described with reference to the drawings wherein.

DESCRIPTION OF EXEMPLARY EMBODIMENTS

In a typical embodiment, the method of advising a consumer during the selection of a lens includes measuring the optical property of the lens as a ratio in a readout from the light sensor when the lens is placed between the light source and the light sensor, and when the lens is not placed between the light source and the light sensor.

In another typical embodiment, an operator places at least one comparison lens between the light source and the light sensor and measures the optical property of the comparison lens. The operator then displays the optical property of the comparison lens adjacent to the optical property of the lens on the display device. In yet another typical embodiment, the optical property of the lens is compared to the optical property of a lens that is mounted in a frame that the consumer is currently using. Thus, the consumer can compare a new lens to the performance of the habitual spectacle lens of the consumer because the demonstration tool is configured such that not only single lenses but also spectacle (i.e., framed) lenses can be tested.

In a particular embodiment, a lens is pre-selected from a plurality of lenses based on the information obtained from the consumer about the consumer's viewing habits or the consumer's lifestyle. In another particular embodiment, a base material or a coating material of the lens is pre-selected based on the information obtained from the consumer.

Typically, the operator displays on the digital display how ultraviolet (UV) light or high-energy visible (HEV) light can potentially damage ocular structures and/or compromise the vision quality of the lens. In another particular embodiment, the demonstration tool further includes a model of a human eye. Also typically, the display device is a tablet, a smart phone, or a computer monitor. With particularity, the display device is a tablet.

In a typical embodiment, the optical property is at least one of a transmittance of the lens or a cut-off value of the lens. In another typical embodiment, the electronic communication is wireless or wired.

In a particular embodiment, the demonstration tool includes a plurality of light sources, wherein each light source from the plurality of light sources can be selected separately to measure the optical property. In another typical embodiment, the demonstration tool includes a plurality of light sensors, and each light sensor from the plurality of light sensors can be selected separately to measure the optical property. In yet another particular embodiment, the at least one light source is a UV light source or a HEV light source.

In a particular embodiment, educating the observer includes at least one of training the observer on how to operate the demonstration tool and informing the observer about the optical property of the lens.

Figure 1:
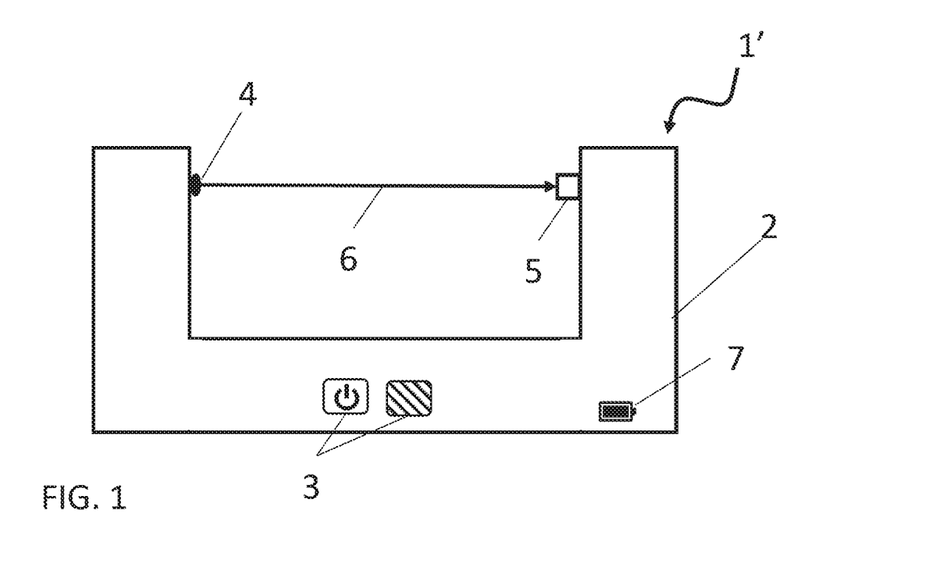
FIG. 1 shows a schematic view of a demonstration tool 1'.

Turning to the drawings, FIG. 1 shows a schematic depiction of a demonstration tool 1', which is used to demonstrate the optical properties of a lens to an observer. Frame 2 of the demonstration tool typically houses a battery (not shown). Further, a processor and/or a computer storage medium can be included in the frame 2. The frame includes buttons 3 for turning the demonstration tool on or off and for selecting a light source 4 and/or a light sensor 5. After turning the demonstration tool on, the light source 4 emits a light beam 6. The intensity of the light beam 6 is measured by the light sensor 5. The readout from the light sensor is stored on the computer storage medium. Battery indicator 7 indicates the charging state of the battery. Additionally, in an exemplary embodiment, the demonstration tool has connecters for a power supply, a computer, and/or a display device. In this disclosure, the term "and/or" in a list means that at least one item from the list is selected, but any number of items—including all of the items—can be present. If fewer than all items are selected, "and/or" is meant to encompass any possible combination or permutation of the selected items. Any or all of the features of demonstration tool 1' shown in FIG. 1 can also present in demonstration tool 1 shown in FIG. 2, and vice versa.

Figure 2:
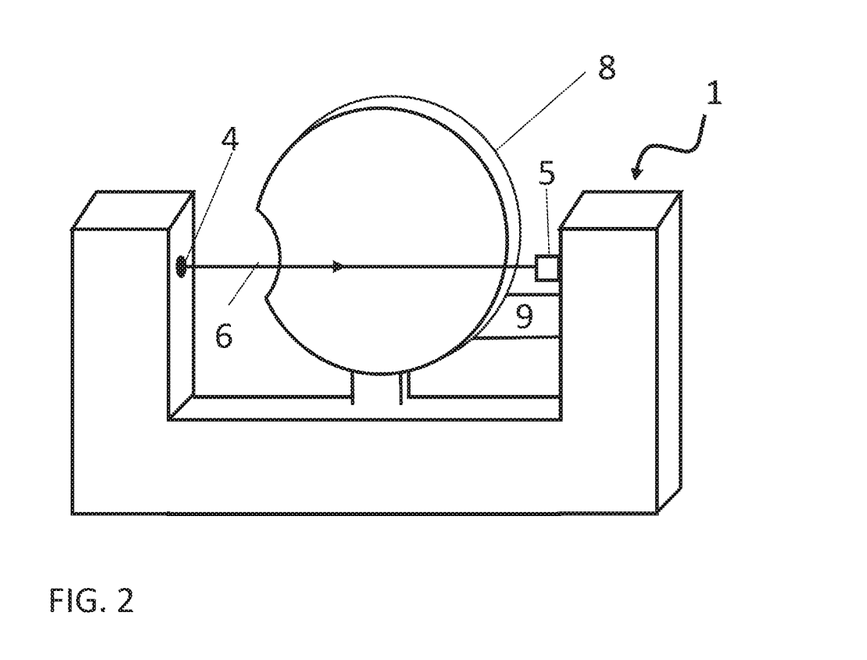
FIG. 2 shows a perspective view of a demonstration tool 1 including an eye model.

FIG. 2 shows another exemplary embodiment of a demonstration tool 1, which further includes a model of a human eye 8. Specifically, model 8 is cutaway representation of a human eye along a vertical plane through the center of the lens and the optic nerve. In an exemplary embodiment, a representation of the optic nerve is provided in the half-cylinder section 9. Thus, model 8 is provided in the form of a hemisphere which can be imprinted on the interior to show the anatomy of the human eye. In particular, model 8 can be imprinted or sculpted to show ocular structures like the iris, the ciliary body, uvea, sclera, retina, blood vessels, nerves, etc. The amount of details shown may vary between different models. Model 8 is provided to demonstrate how the eye can be effected by light, in particular by ultraviolet (UV) light or by high-energy visible (HEV) light. Nonetheless, the model 8 does not affect the determination of optical properties of lenses for spectacle glasses. In particular, as shown in FIG. 2, light beam 6 does not strike model 8, but can reach light sensor 5 unattenuated, i.e., in the same manner that light beam 6 reaches light sensor 5 in demonstration tool 1'.

Figure 3:
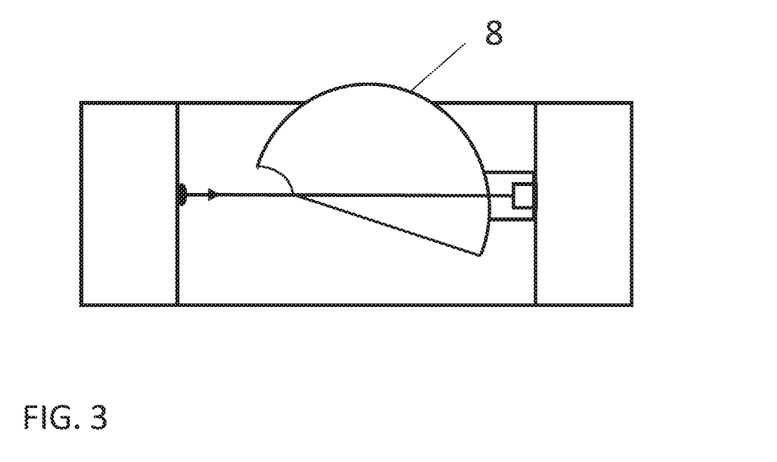
FIG. 3 shows a top view of a demonstration tool 1.

FIG. 3 depicts, in a schematic manner, a top down view of demonstration tool 1, and shows that the cutaway plane of the eye model 8 can be arranged to be tilted with respect to beam path 6. The cutaway plane is further tilted with regard to a vertical plane perpendicular to the ground and including the beam path. However, the specific arrangement of the eye model relative to the frame is not particularly limited, as long as the eye model is arranged without blocking light beam 6 from reaching light sensor 5.

Figure 4:
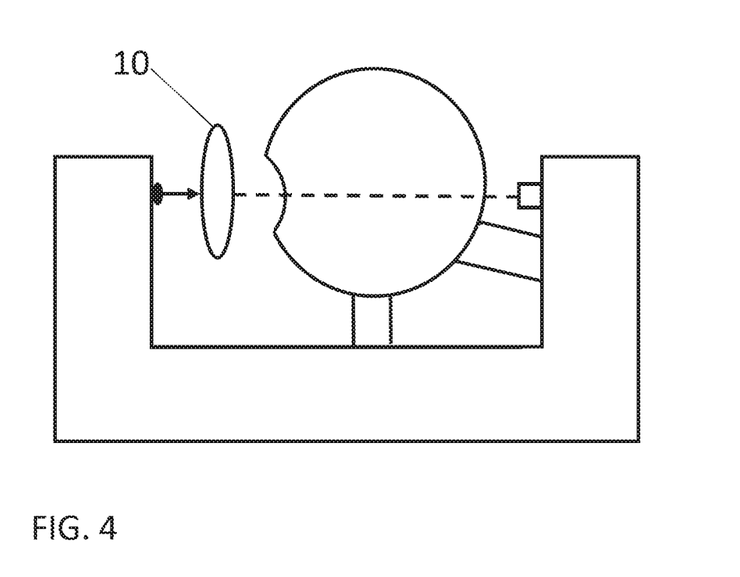
FIG. 4 shows a side view of a demonstration tool with a lens placed in the beam path 6.

In FIG. 4, lens 10, which is to be evaluated regarding its performance, is provided between light source 4 and light sensor 5. If the lens absorbs at least some of the light emitted by the light source 4, less light reaches light sensor 5, which results in a different readout from the light sensor. By comparing the readout from the light sensor without a lens in the beam path to the readout when the lens is in the beam path, an optical property of the lens can be measured.

Figure 5:
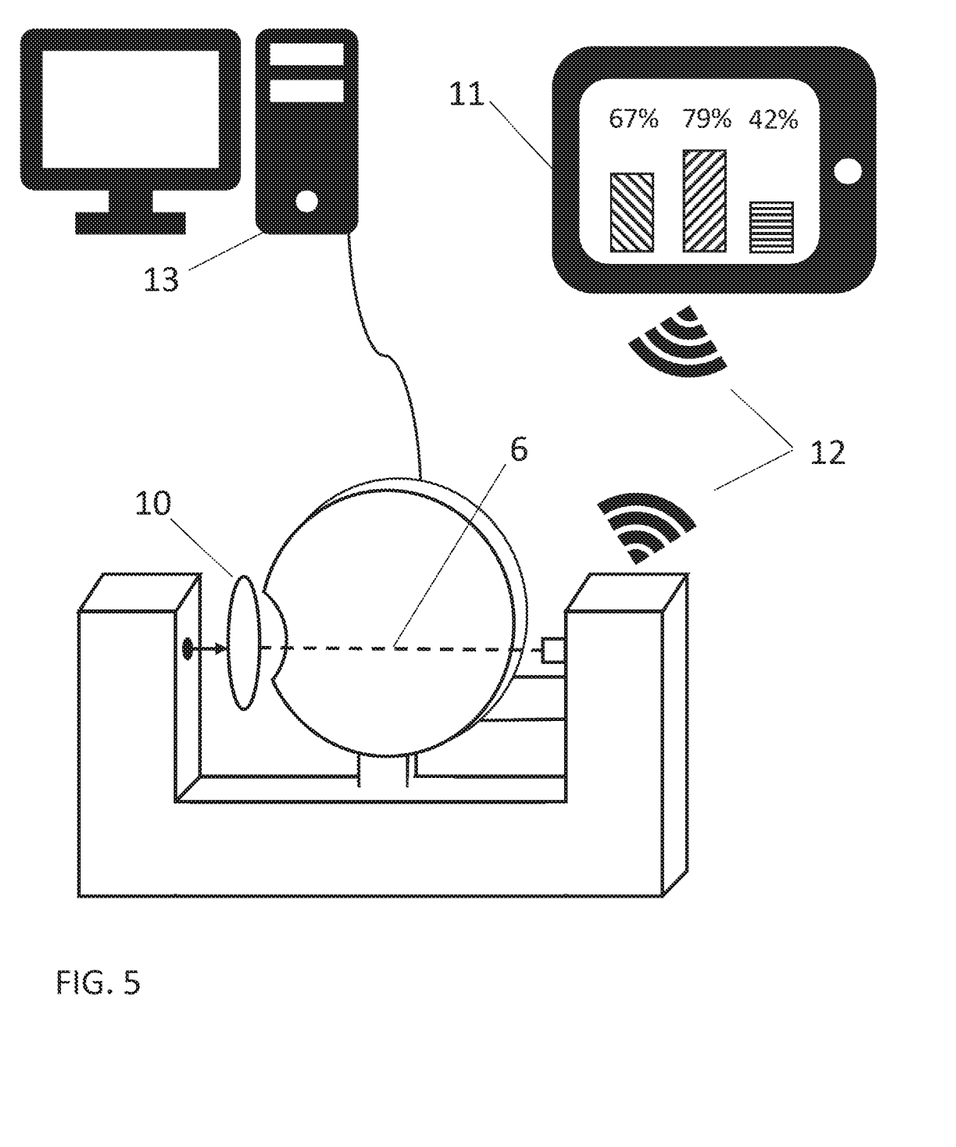
FIG. 5 shows a perspective view of a demonstration tool in electronic communication with a display device.

FIG. 5 shows demonstration tool 1 in electronic communication with a computing or display device, such as tablet 11 or computer workstation 13. The electronic communication can be a wireless communication 12 or wired. The wireless communication includes, but is not limited to, Bluetooth® or a Wi-Fi connection. The demonstration tool can be fully controlled by the display device so that the optical property of the lens can be calculated and shown on the display device.

Figure 6:
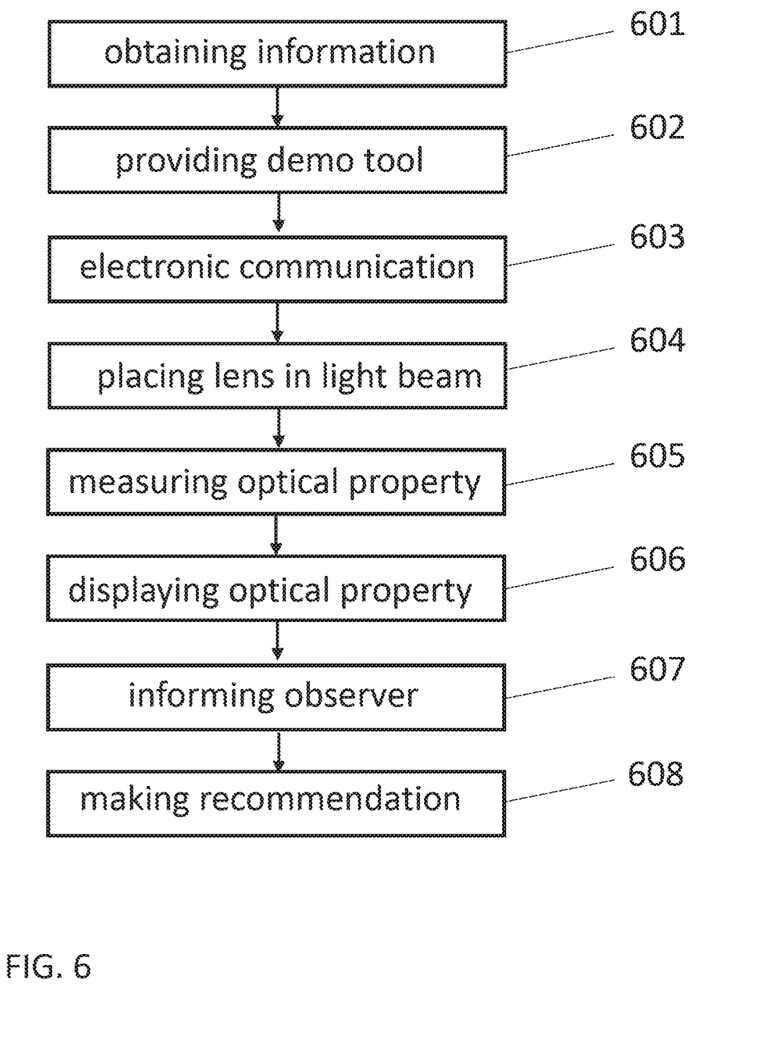
FIG. 6 shows a flow diagram according to a typical embodiment of the disclosure.

FIG. 6 shows an exemplary embodiment of a method of advising a consumer who is selecting a lens for spectacle glasses. While the method is shown as a sequence of successive steps 601 to 608, the precise sequence is not a requirement and variations are possible. For example, certain steps may be performed in a different order or may be performed more than once. Steps can be performed sequentially, (partly) overlapping in time, or simultaneously. Steps that are performed more than once may be performed before, during, or after any of the other steps. In step 601, a consumer who is interested in purchasing new spectacle glasses is asked questions about his or her viewing habits and/or lifestyle. Some of the questions provide information about the viewing habits and the lifestyle of the consumer. Typically, the person asking the questions is an ophthalmologist or an optometrist. For the sake of simplicity, the person asking the question is hereinafter referred to as an optometrist, even though the person may be an ophthalmologist. It is also typical that the optometrist performs all the steps. However, the steps may also be performed by two or more people; for example, an employee of the optometrist may help in setting up the demonstration tool.

Questions about the consumer's viewing habits that may be asked by the optometrist include, but are not limited to, any the following: Do you feel uneasy driving at night? Are you sensitive to light? Do you have to clean your glasses frequently? Are you sensitive to glare and reflections from the sun, for example from reflecting surfaces, such as a windshield or a wet road? Do you perform tasks that expose you to increased amounts of dust or debris, for example wood working? Do your current glasses leave pressure marks? Do your current glasses slide frequently?

Questions that may be asked concerning the lifestyle include, but are not limited to, any of the following: What is your profession? What kind of tasks do you perform at home, such as do you cook and if so, how much. What other tasks do you perform? Do you go to school or college? Do you pursue further education, such as post-grad studies? How do you commute, i.e., do you bike or drive a car or motorcycle? What kinds of digital devices do you use, such as a smart phone, a tablet, or a personal computer? How much time do you spend in front of these digital devices? What are your hobbies? What kinds of sports do you play? Do you travel? How much time do you spend in the sun?

During or after asking the questions, the optometrist provides the demonstration tool 1 or 1' indicated as step 602 in FIG. 6. In the following, demonstration tool 1 is used to refer to the demonstration tool 1 with the eye model 8, as well as to the demonstration tool 1' without the eye model, unless the eye model is specifically described. If the demonstration tool 1 is not yet turned on, the optometrist pushes power button 3. In step 603, electronic communication between the demonstration tool 1 and the device is established manually or automatically. Once the electronic communication is established, the optometrist can control the demonstration tool from the display device.

The demonstration tool includes at least one light source and at least one light sensor. If only one light source and one light sensor are included, the light source is turned on and a value is read out from the light sensor. However, if more than one light source is present, the optometrist selects one of them. Typically, at least one UV light source and one HEV light source are provided. Also typically, the UV light source emits light in the wavelength region between 350 nm and 400 nm, more typically between 370 nm and 400, and even more typically around 385 nm. With particularity, the HEV light source emits light in the wavelength region between 400 nm and 490 nm, more particularly between 400 nm and 450 nm, and even more particularly, around 430 nm. In a particular embodiment, the UV light source can be a light-emitting diode (LED) emitting light with a wavelength of about 385 nm and the HEV light source can be an LED emitting light with a wavelength of about 430 nm. In another particular embodiment, an infrared light (IR) source is provided. Typically, the IR light source emits light with a wavelength of 750 nm or more.

If the optometrist has determined that the consumer may benefit from a pair of spectacle glasses that provide protection from ultraviolet light in particular, the UV light source is chosen. Similarly, the HEV light source is chosen when the optometrist has determined that the consumer would benefit from spectacle glasses protecting from high-energy visible light. In the latter case, the optometrist may show the additional benefit of the HEV protecting lenses to serve as protection in the UV as well. In a typical embodiment, a light sensor is sensitive to light from more than one light source, such as a sensor that is sensitive to UV and HEV light. However, it is also possible to select a light sensor that is particularly sensitive to the light emitted from the selected light source. Typically, two or more light sensors are included in the demonstration tool. More typically, two or more light sensors are included wherein one light sensor is particularly sensitive to UV light and another light source is particularly sensitive to HEV light. In another typical embodiment, an IR light sensor is included.

As soon as the optometrist has turned on either the only light source or the selected light source, a readout from the only or from the selected light sensor can be obtained. This readout value represents a measure of how much potentially damaging light, such as UV light, reaches the eye of the consumer without glasses. In step 604, the optometrist places a lens into the beam path 6 that protects the eye from UV light. The light beam reaching the light sensor 5 is now attenuated because the lens transmits less light at the wavelength or wavelength region emitted by the light source 4. Thus, the portion of beam path 6 after being transmitted through lens 10 in FIG. 5 is shown as a dashed line.

In step 605, an optical property of the lens is measured. For example, the demonstration tool's processor can take the ratio of the readout from the light sensor when the lens is in the beam path over the readout from the light sensor when the lens is not in the beam path to determine the transmittance of lens at the wavelength or wavelength region of the light source 4. Additionally or alternatively, the cut-off value of the lens at the wavelength or wavelength region can be measured, which is defined as 100%–transmittance. For example, the lens that is placed in the beam path of the demonstration tool in FIG. 5 has a transmittance of 67%. The lens could also be described as having a cut-off of 33%, i.e., that in the example above, 33% of harmful UV light is prevented from reaching the eye. As noted above, the computer memory, which is a non-transitory computer readable storage medium, stores the readout from the light sensor with and without the lens being present in the beam path. However, the readouts may be obtained in any order, i.e., it is permissible, but not required, to obtain the readout without the lens in the beam path first.

In step 606, the display device displays the optical property of the lens 10. In the exemplary embodiment shown in FIG. 5, the lens has a transmittance of 67%. The display device can further display previously measured lenses. In FIG. 5 the display device shows the transmittance values of two previously measured lenses with values of 79% and 42%, respectively. In another typical embodiment, three previously measured transmittances can be displayed next to the value of the currently measured lens. Therefore, the consumer can see a side-by-side comparison of different lenses for spectacle glasses within the same active window on the display device. Moreover, the lens for comparison may be a lens from the pair of spectacles that the consumer is wearing when he or she enters the optometrist's shop.

The optometrist can now inform the consumer in step 607 how the optical property might affect at least one of a visual perception, a wellbeing, an eye heath status, and an eye health condition of a wearer of spectacle glasses that include the lens. For example, if the lens is particularly suitable to reduce sun glare, the optometrist can open a new window on the display device and show the consumer a side-by-side comparison of two images, one as it is perceived by a wearer of spectacle glasses including the lens with reduced glare, and one as it is perceived by the same wearer, but with glasses that do not have the same sun glare reducing properties.

In step 608, the optometrist can now make a recommendation for one of the lenses that have been demonstrated with the demonstration tool 1. In contrast to a recommendation made without the demonstration tool 1, the exemplary embodiment of a method of advising a consumer shown in FIG. 6 allows the optometrist to engage and involve the consumer to a much greater extent. As a result, the recommendation becomes far less abstract because the consumer can experience the benefits of a particular lens in an intuitive manner. Moreover, the ability to demonstrate further information, such as the side-by-side comparison of images showing reduced glare, alongside with the optical properties of the lens, allow the consumer to understand better why a particular lens is being recommended. Other information that may be provided include, but are not limited to, information showing how the lens facilitates reading at different distances, how the lens offers a greater field of view, or how the lens improves the three-dimensional perception of the wearer.

The optometrist may perform the method of the exemplary embodiment of FIG. 6 as a stand-alone procedure, for example when the consumer has already obtained a prescription for correcting his or her ametropia. Further, the optometrist may interrupt the workflow, for example to make a recommendation for a progressive addition lens (PAL) design or others, and return to the workflow. In addition, the optometrist may perform the method of the exemplary embodiment of FIG. 6 as part of another consultation or an eye exam, such that method of the exemplary embodiment becomes an encapsulated part in an entire workflow that includes, for example, measuring the refraction of the eye, determining the interpupillary distance, contrast sensitivity test, or other procedures known to the skilled artisan.

An optometrist who is advising a consumer wishing to purchase spectacle glasses can use the demonstration tool 1 to make recommendations for a lens far more efficient, personalized, and instructive. In particular, the process becomes more stream-lined because despite having more options for lenses available than ever, the optometrist can guide the consumer to a subset of lenses that comply with all external parameters, while offering the consumer a meaningful choice. Further, the consumer can learn additional information about the lens, such as how well the lens reduces sun glare or improve night time driving, while also learning about the optical properties of the lens. Thus, the demonstration tool ties together all the different aspects required for choosing a lens in an intuitive manner.

What is more, the optometrist advising a consumer can recommend a lens not only for its optical properties, but also by direct comparison to another lens. Moreover, the additional information available on the display device can demonstrate the benefits of protection from UV or HEV light, the reduction of sun glare, or how the lens is beneficial for the consumer's individual viewing habits, to name just a few. Thus, recommending a lens is taken to a new level by combining, optical measurements, eye health information, and the optometrist's expertise in a meaningful manner.

Figure 7:
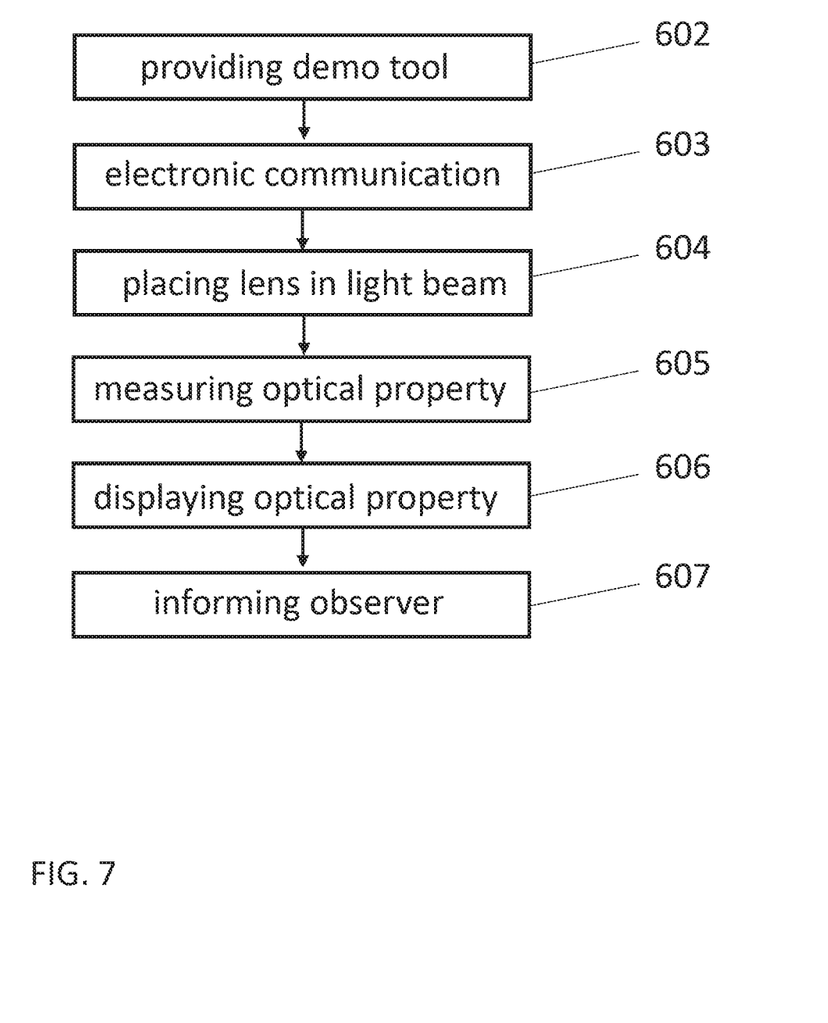
FIG. 7 shows a flow diagram according to another typical embodiment of the disclosure.

In the exemplary embodiment of a method of educating an observer on how to demonstrate an optical property of a lens for spectacle glasses shown in FIG. 7, a demonstration tool 1 is used to perform steps 602 to 607 in the same manner as described above with regard to the exemplary embodiment of a method of advising a consumer who is selecting a lens for spectacle glasses shown in FIG. 6. However, the observer in the exemplary embodiment shown in FIG. 7 is typically not a consumer who wants to purchase glasses, but can be, for example, an optometrist who wants to employ the demonstration tool in his or her business. Further, the observer can be an optometrist or a sales person who wants to learn more about a particular type of lens. The sales person may thus perform the method of educating an observer on how to demonstrate an optical property of a lens for spectacle glasses shown in FIG. 7 to an optometrist. The optometrist may be the observer in the method of the exemplary embodiment in FIG. 7 to subsequently be able to advise a consumer using the exemplary embodiment of FIG. 6.

The method of educating an observer on how to demonstrate an optical property of a lens for spectacle glasses shown in FIG. 7 allows the observer to learn about the optical properties of unknown lenses, i.e., lenses that the observer was not familiar with, much faster and effectively. Additionally, the observer will be able to recommend the lenses more persuasively because the observer has seen directly and in a more illustrative manner how these lenses compare to known lenses.

Demonstration tool 1 is a powerful aid to further an understanding of the benefits of the potential health benefits of certain lenses. However, the demonstration tool 1 is not intended, and should not be used as a measurement device that delivers technical measured values or data for any further scientific utilization. Moreover, the demonstration tool is not a medical device for supporting an optometrist, ophthalmologist, or any other professional during a medical consultation process.

The foregoing description of the exemplary embodiments of the disclosure illustrates and describes the present invention. Additionally, the disclosure shows and describes only the exemplary embodiments, but, as mentioned above, it is to be understood that the disclosure is capable of being used in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents, and patent applications cited in this specification are herein incorporated by reference, and for any and all purposes, as if each individual publication, patent, or patent application were specifically and individually indicated to be incorporated by reference. In the case of inconsistencies, the present disclosure will prevail.

The invention claimed is:

1. A method of advising a consumer who is selecting a lens for spectacle glasses, the method comprising:
    obtaining information from the consumer about at least one of the consumer's viewing habits and the consumer's lifestyle,
    providing a portable demonstration tool having a light source and a light sensor for measuring light emitted from the light source,
    establishing an electronic communication between the portable demonstration tool and a display device,
    placing a lens for spectacle glasses between the light source and the light sensor and transmitting the light emitted from the light source through the lens,
    measuring light transmitted through the lens with the light sensor to determine an optical property of the lens,
    displaying the optical property of the lens on the display device to an observer,
    optionally, informing the observer on how the optical property might affect at least one of a visual perception, a wellbeing, an eye health status, and an eye health condition of a wearer of spectacle glasses that include the lens, and
    making a recommendation for the lens that takes into account the optical property of the lens.

2. The method according to claim 1 further comprising:
    measuring the optical property of the lens as a ratio in a readout from the light sensor when the lens is placed between the light source and the light sensor and when the lens is not placed between the light source and the light sensor.

3. The method according to claim 1 further comprising:
placing at least one comparison lens between the light source and the light sensor and measuring the optical property of the comparison lens, and
displaying the optical property of the comparison lens adjacent to the optical property of the lens on the display device.

4. The method according to claim 1 further comprising:
displaying on the digital display how UV light or HEV light can potentially damage ocular structures and/or compromise vision quality of the lens.

5. The method according to claim 1, wherein the portable demonstration tool further includes a model of a human eye.

6. The method according to claim 1, wherein the optical property is at least one of a transmittance of the lens or a cut-off ratio of the lens.

7. The method according to claim 1, wherein the electronic communication is wireless or wired.

8. The method according to claim 1, wherein the portable demonstration tool includes a plurality of light sources, and wherein each light source from the plurality of light sources can be selected separately to measure the optical property.

9. The method according to claim 1, wherein the portable demonstration tool includes a plurality of light sensors, and wherein each light sensor from the plurality of light sensors can be selected separately to measure the optical property.

10. The method according to claim 1, wherein the at least one light source is a UV light source or a HEV light source.

11. The method according to claim 1 further comprising:
pre-selecting the lens from a plurality of lenses based on the information obtained from the consumer about the consumer's viewing habits or the consumer's lifestyle.

12. The method according to claim 11, wherein a base material or a coating material of the lens is pre-selected.

13. The method according to claim 1, wherein the display device is a tablet, a smart phone, or a computer monitor.

14. The method according to claim 13, wherein the display device it a tablet.

15. A method of educating an observer on how to demonstrate an optical property of a lens for spectacle glasses, the method comprising:
providing a portable demonstration tool having a light source and a light sensor for measuring light emitted from the light source,
establishing an electronic communication between the portable demonstration tool and a display device,
placing a lens for spectacle glasses between the light source and the light sensor and transmitting the light emitted from the light source through the lens,
measuring light transmitted through the lens with the light sensor to determine an optical property of the lens,
displaying the optical property of the lens on the display device to an observer, and
optionally, informing the observer on how the optical property might affect at least one of a visual perception, a wellbeing, an eye health status, and an eye health condition of a wearer of spectacle glasses that include the lens.

16. The method of claim 15, wherein educating the observer comprises at least one of:
training the observer on how to operate the portable demonstration tool, and
informing the observer about the optical property of the lens.

* * * * *